United States Patent [19]

Wiener

[11] 4,112,791
[45] Sep. 12, 1978

[54] CABLE-STRIPPING TOOL

[75] Inventor: Hans Wiener, Täby, Sweden

[73] Assignee: C. A. Weidmuller KG, Detmold, Germany

[21] Appl. No.: 740,833

[22] Filed: Nov. 10, 1976

[30] Foreign Application Priority Data

Nov. 11, 1975 [GB] United Kingdom ............... 46580/75

[51] Int. Cl.² .............................................. H02G 1/12
[52] U.S. Cl. .................................... 81/9.5 A; 30/90.1
[58] Field of Search ............. 30/90.1; 81/9.5 R, 9.5 A

[56] References Cited

U.S. PATENT DOCUMENTS

| 492,158 | 2/1893 | Harrington | 30/90.1 X |
|---|---|---|---|
| 2,089,774 | 8/1937 | Wachstein | 81/9.5 R X |
| 2,770,154 | 11/1956 | Schinske | 81/9.5 A |
| 2,817,255 | 12/1957 | Lormeau | 81/9.5 R X |
| 3,915,037 | 10/1975 | Wiener | 81/9.5 A |

Primary Examiner—Al Lawrence Smith
Assistant Examiner—James G. Smith
Attorney, Agent, or Firm—Karl F. Ross

[57] ABSTRACT

A plier-like tool for stripping insulaton from sheathed cables or wires has an elongate body terminating at a front end in a first gripping jaw and at a rear end in a first shank toward which a second shank, forming part of a handle pivoted to the body, is movable to clamp the end of a cable between the first gripping jaw and a coacting second gripping jaw also pivoted to the body. The second gripping jaw is controlled by the handle via a camming mechanism which also displaces a link member along the body, that link member being rigid with a first stripping jaw and being articulated to a second stripping jaw and being articulated of the two gripping jaws for pulling insulation off the clamped cable end. The rear end of the link member, remote from the stripping jaws, is positively guided in a rib of the body and is slidably connected with a guide member resting against an overhanging shelf of the body provided with a detent formation, the sliding connection between the link and guide members including a slot extending parallel to the shelf and to a guide track of the first gripping jaw along which the first stripping jaw slides; the subassembly of guide member, link member and stripping jaws can thus be positively secured to the tool body without riveting or other fastening operations. A front edge of the guide member defines with an upper edge of the link member and with a rear edge of an upward projection thereof an upwardly open recess which is narrowed upon a rearward sliding of the link member, at least one of these edges being sharpened for cutting into the insulation of a cable inserted into that recess.

10 Claims, 9 Drawing Figures

CABLE-STRIPPING TOOL

FIELD OF THE INVENTION

My present invention relates to a plier-like tool for cutting slender workpieces, such as cables or wires or for stripping insulating sheathing therefrom.

BACKGROUND OF THE INVENTION

In my prior U.S. Pat. No. 3,915,037 I have disclosed a tool of this type with an elongate body terminating at a front end in a first gripping jaw and at a rear end in a first shank toward which a second shank, forming part of a handle pivotally mounted on the body, can be moved in order to clamp the end of a cable or similar workpiece between teeth of the first gripping jaw and of a coacting second gripping jaw also pivoted to the body. The operative connection between the handle and the second gripping jaw includes a camming mechanism which also controls a link member lying alongside the tool body, this link member being rigid with a first stripping jaw and being articulated to a second stripping jaw so as to pull these jaws rearwardly along respective guide tracks of the two gripping jaws in order to detach a piece of insulation from a cable end clamped by the teeth of the gripping jaws. A preliminary severing of that piece of insulation from the remainder of the cable can be accomplished by first inserting the cable into an outwardly diverging lateral recess formed between two confronting lands on the link member and on an associated guide member fastened to the tool body, the forwardly facing land of the guide member being sharpened to form a cutting edge which bites into the insulation of the cable as the handle is squeezed to retract the link member together with the stripping jaws.

OBJECTS OF THE INVENTION

An object of my present invention is to provide an improved tool of the character set forth which can be more conveniently assembled, and even disassembled in case of need, without requiring the use of rivets or other fasteners to hold the guide and link members in position.

Another object is to provide a modified configuration of the lands bounding the aforementioned lateral recess for the purpose of enabling more effective cutting of the cable insulation or even of the entire workpiece and reducing the risk of accidental injury to the operator.

SUMMARY OF THE INVENTION

According to one aspect of my present invention, the link member is supported on the one hand by restraining means on the first shank engaging an extension of that member and on the other hand by a sliding connection with the aforementioned guide member which rests against an abutment on the tool body and is held by that abutment against displacement in a longitudinal direction parallel to the guide track of the first stripping jaw. A third point of support may be provided by a rigid connection between the link member and the first stripping jaw; in that instance the guidance of the link extension by the restraining means can be less precise and has only to prevent lateral excursions of that extension. This mode of mounting not only leaves the link member with a single degree of freedom, i.e. with displaceability relative to the tool body in the longitudinal direction, but also holds the guide member in a predetermined position on that body.

Pursuant to another feature of my invention, the confronting lands forming the boundaries of the lateral recess converge outwardly at least in the vicinity of the open side of that recess. This has the following advantages:

(a) the sloping edge or edges of the lands moving toward each other tend to retain the workpiece (referred to hereinafter as a cable) in the recess during the cutting operation;

(b) if the cutting edge is formed on a land inclined at an acute angle to the direction of displacement, that edge will be less readily accessible from the outside so that even an incautious user will be protected from possible injury;

(c) as the sloping land or lands force the cable toward the bottom of the recess, the cutting edge (or one of several of such edges) could be located on a lateral land of the link member extending generally parallel to the direction of displacement, such an edge deep within the recess being again virtually inaccessible.

BRIEF DESCRIPTION OF THE DRAWING

The above and other features of my invention will now be described in detail with reference to the accompanying drawing in which.

SPECIFIC DESCRIPTION

Figures 1, 9:
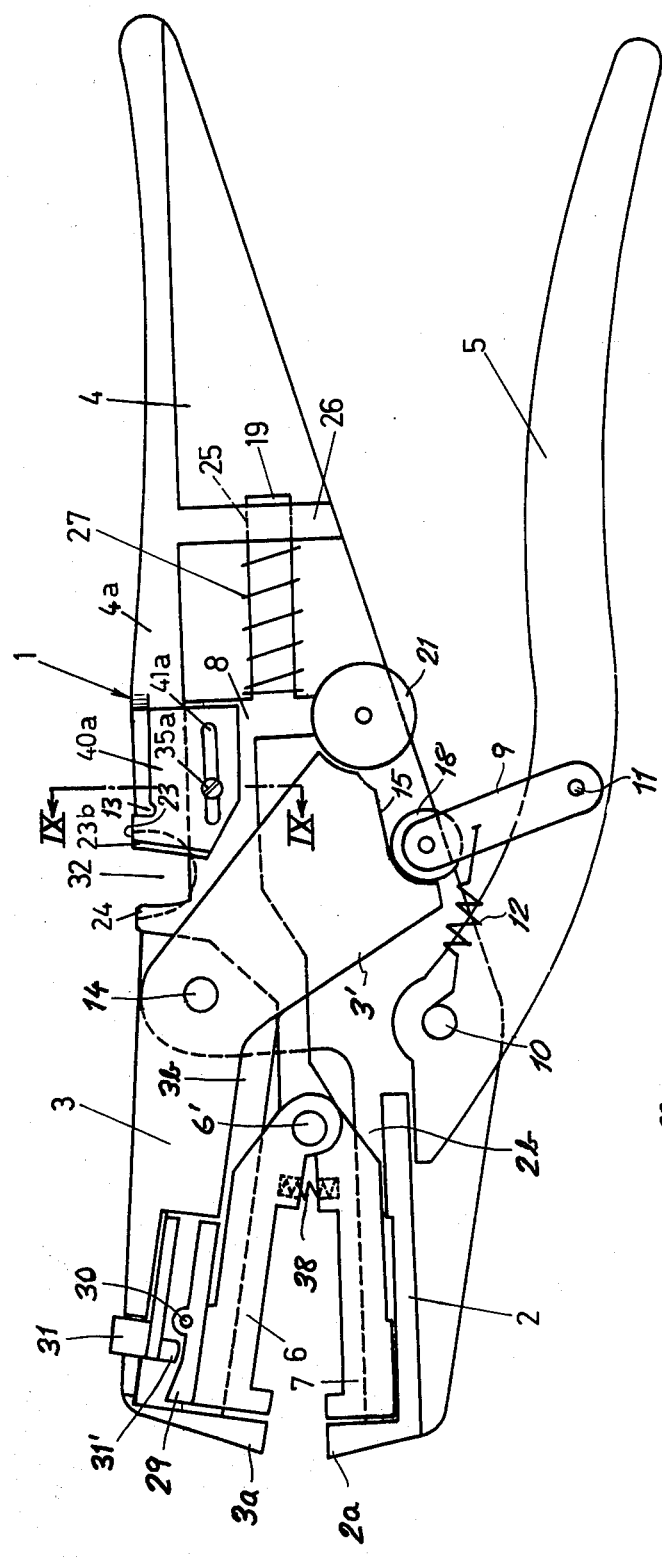
FIG. 1 is a side-elevational view, similar to the corresponding Figure of my prior patent, showing an improved cable-stripping tool according to my present invention.
FIG. 9 is a fragmentary cross-sectional view taken on the line IX—IX of FIG. 1.

Throughout the drawing, elements having counterparts in my prior U.S. Pat. No. 3,915,037 have been identified with the same reference numerals.

In common with the disclosure of that prior patent, and as shown in FIG. 1, a cable-stripping tool according to my invention has a body 1 forming a rearwardly extending first shank 4 and a forwardly extending first gripping jaw 2, the latter coacting with a second gripping jaw 3 which is articulated to body 1 by a pivot pin 14. A handle 5, similarly articulated to body 1 by a pivot pin 10, forms a second shank which can be manually moved toward the first shank 4 against the force of a spring 12 anchored to pivot 10. Spring 12 engages an arm 9, articulated to handle 5 at a fulcrum 11, which carries a roller 18 bearing upon a camming surface 15 on a rearward extension 3' of jaw 3. A squeezing of the handle 5, therefore, swings the jaw 3 counterclockwise about its fulcrum 14 whereby extensions on teeth 2a and 3a of the two gripping jaws approach each other to clamp the end of a cable between them.

Gripping jaws 2 and 3 form a pair of guide tracks 2b and 3b for a first stripping jaw 7 and a second stripping jaw 6, the former being rigid with a front portion of a link member 8 to which the latter is articulated at a fulcrum 6'. The two pairs of jaws 2, 7 and 3, 6 are urged apart by a compression spring 38. Link 8 has a rear portion 19, of rectangular cross-section, matingly accommodated in a bore 25 of a transverse rib 26 of shank 4 also serving as a stop for a coil spring 27 which tends to hold the link 8 and with it the jaws 6 and 7 in their illustrated forward position. The roller 21 on link 8 is engaged by roller 18 as the latter is deflected rearwardly along camming surface 15 when the shank 5 is swung counterclockwise toward shank 4 to close the jaw teeth 2a and 3a on an interposed cable. This results in a delayed rearward shift of link member 8, retracting the stripping jaws 6 and 7 from the teeth 2a and 3a with entrainment of a piece of insulation previously severed from the remaining cable sheath, such severance having been performed in a laterally open recess 32. That recess is bounded by a rearwardly facing land on a projection or lug 24 of link member 8 and by a stationary cutting edge 23b on a forwardly facing land of an element 23 secured to tool body 1.

A rocker 29, pivoted at 30 on jaw 3, cammingly coacts with a stud 31' whose position is adjustable by a knob 31 and which controls the approach of the stripping jaw 6 toward its mate 7 as the two stripping jaws are jointly pulled back by the link 8 rigid with jaw 7. The structure so far described essentially conforms to that of my prior patent to which reference may be made for further details.

The relative mobility of lug 24 and cutting edge 23b is sufficient to enable a complete elimination of recess 32 by a full swing of shank 5. Thus, the tool here disclosed can also be used for cutting a cable, rod or similar workpiece completely in two.

In accordance with my present invention, and as particularly illustrated in FIGS. 1 and 9, element 23 forms part of a guide member 40a which rests against an abutment formed by a longitudinal rib 4a of shank 4, this rib terminating in a dog 13 which snaps into a notch 23a of member 40a (see FIGS. 2 and 3) when the subassembly consisting of members 8, 40a and jaws 6, 7 is emplaced on the tool body 1. Members 40a and 8 are slidingly interconnected by a pair of mating formations which in this instance include a pin 35a threaded into an intermediate portion of link member 8 and passing through a slot 41a in guide member 40a. Pin 35a has a head larger than the slot width to hold the two members together. Slot 41a extends in the longitudinal direction of body 1 defined by the first guide track 2b along which the stripping jaw 7 is slidable against the force of spring 27, this being also the direction of extension 19 received in aperture 25. The elements of this subassembly and/or the tool body 1 should, of course, be sufficiently resilient to facilitate their interfitting in the position illustrated. Except for its jaw portion 2, body 1 may consist of a material of relatively low strength such as a light-metal alloy or a synthetic resin. The jaws and the two interconnected members 8 and 40a, on the other hand, should be made of high-strength material such as sheet steel.

Figure 2:
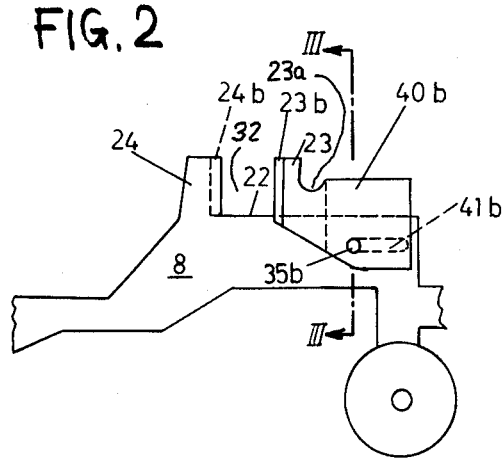
FIG. 2 is a fragmentary side view of a modified link member for the tool of FIG. 1 together with an associated guide member.
Figure 3:
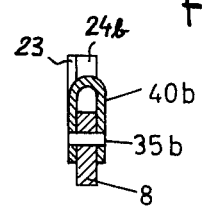
FIG. 3 is a fragmentary cross-sectional view taken on the line III—III of FIG. 2.
Figure 4:
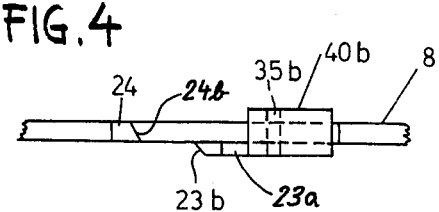
FIG. 4 is a top view of the subassembly shown in FIG. 2.
Figure 7:
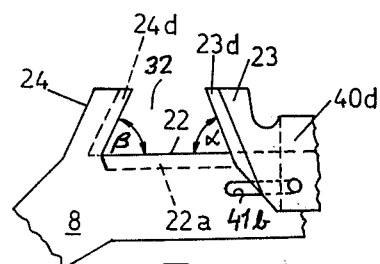
FIGS. 5–8 are views similar to FIG. 2 showing further modifications.

In FIGS. 2–8 I have shown various modifications of the slidingly interconnected guide and link members. According to FIGS. 2–4, a guide member 40b has an inverted-U profile with a bight portion embracing the link member 8 from above. A pin 35b bridges the two legs of the "U" and passes through a longitudinal slot 41b in link member 8. FIGS. 2 and 4 further show that the two confronting lands of elements 23 and 24 are beveled or sharpened to form a pair of coacting cutting edges 23b and 24b extending perpendicularly to a lateral land 22 of link member 8 defining the bottom of recess 32.

Figure 5:
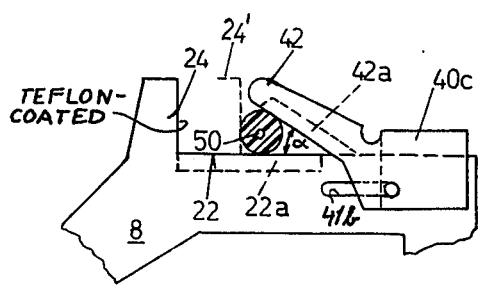

FIG. 5 shows another guide member 40c which has the same U-profile as member 40b in its rear portion and whose front portion 42 is inclined to the lateral land 22 of link member 8 at an acute angle $\alpha$ which may range between about 30° and 60°. The rearwardly facing land of lug 24 is devoid of any cutting edge and, advantageously, has a low-friction coating of Teflon, for example, in order to force a cable 50 into the gap between lands 22 and 42 which are both provided with cutting edges 22a and 42a. Thus, upon a rearward movement of member 8 (to the right in FIG. 5) into a position indicated in phantom lines at 24', both lands 22 and 42 will act as blades cutting into the cable insulation and severing it as the cable is manually rotated with continuing pressure upon handle 5 (FIG. 1). Such severance would also take place, albeit at a slower rate, if one of the cutting edges 22a, 42a were omitted.

Figure 6:
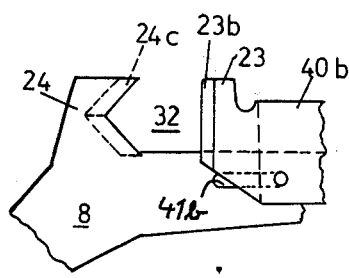

In FIG. 6 I have shown the same guide member 40b as in FIGS. 2–4, with replacement of the straight cutting edge 24b of lug 24 by a generally V-shaped edge 24c; the vertex of the "V" points away from the confronting edge 23b of member 40b so that the boundaries of the recess 32 converge in its upper half toward its open side. Such a convergence also exists in the construction of FIG. 5 as well as in that of FIG. 7 wherein the cutting edge 24d on lug 24 is rearwardly inclined to include with land 22 an acute angle $\beta$ of the same order of magnitude as angle $\alpha$. In this instance all three boundaries of recess 32 have been shown as cutting edges 22a, 23d and 24d although, again, one or even two of these cutting edges could be omitted. Edge 23d is part of a modified guide member 40d generally similar to member 40b.

Figure 8:
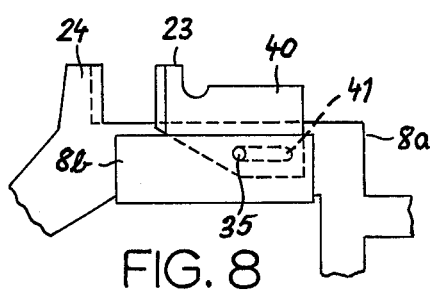

In FIG. 8 I have illustrated a kinematic inversion of the arrangement of FIGS. 2–4 in which a guide member 40 is embraced by a bight portion of a link member 8a, the latter having a generally J-shaped profile over an area extending past a slot 41 of the guide member. The shorter leg of the "J", designated 8b, rises above the slot 41 and is engaged by a pin 35 traversing that slot, this pin being also lodged in the main part of link member 8a.

In each instance, therefore, the presence of a guide member clipped onto the tool body 1 restrains the intermediate portion of the associated link member in a direction transverse to the swing plane of shank 5 while the slot-and-pin coupling between these two members prevents lateral excursions of the link member within that swing plane, as does the insertion of its tail 19 into the bore 25 of wall 26. This mode of guidance avoids any relative disalignment of the elements 23 (or 42), 24 forming confronting boundaries of recess 32.

Naturally, the arrangements just described could be modified in various ways without materially altering its mode of operation, as by transposing the positions of the slot and the pin in the two members. It will also be clear that the different edge configurations shown in FIGS. 5–7 could be interchangeably used with the subassemblies of FIGS. 1, 2–4 and 8. In fact, the sloping edges of FIGS. 5–7 can be used with advantage in a tool whose link member is mounted in a different manner on the tool body, e.g. as taught in my prior U.S. Pat. No. 3,915,037.

I claim:

1. A tool for handling slender workpieces, comprising:

an elongate body provided at a front end thereof with a first gripping jaw and terminating at a rear end thereof in a first shank;

a second gripping jaw swingably mounted on said body, said gripping jaws being respectively provided with confronting first and second guide tracks extending rearwardly from a pair of cable-clamping extensions;

a first stripping jaw slidable along said first guide track;

a second stripping jaw articulated to said first stripping jaw and slidable along said second guide track;

a link member with a front portion, an intermediate portion and a rear portion slidable along said body in a longitudinal direction generally parallel to said first guide track, said front portion being positively coupled with said stripping jaws, said first shank being provided with restraining means engaging said rear portion for preventing lateral excursions thereof in the swing plane of said second gripping jaw;

a handle pivotally mounted on said body, said handle forming a second shank alongside said first shank and being operatively connected with said second gripping jaw and with said link member for moving said extensions toward each other and rearwardly retracting said stripping jaws and said link member upon being swung toward said first shank; and a guide member detachably secured to said body close to said intermediate portion and coupled by coacting formations with said link member for joint removal from said body together with said stripping jaws, said formations enabling relative displacement of said members in said longitudinal direction while preventing such displacement in a direction transverse to said swing plane, said body being provided with abutment means engaging said guide member and preventing any relative displacement thereof, said intermediate portion having a projection provided with a rearwardly facing land confronting a forwardly facing land of said guide member across a laterally open recess narrowing upon rearward movement of said link member under the control of said handle, said recess being further bounded by a lateral land extending generally in said longitudinal direction, at least one of said lands having a cutting edge for biting into the insulation of a cable inserted into said recess.

2. A tool as defined in claim 1 wherein said formations are a slot extending in said longitudinal direction on one of said members and a pin on the other of said members received in said slot.

3. A tool as defined in claim 1 wherein one of said members has a bight portion embracing the other of said members.

4. A tool as defined in claim 1 wherein said confronting lands converge toward the open side of said recess.

5. A tool as defined in claim 1 wherein at least one of said confronting lands has a generally V-shaped cutting edge with the vertex of the V pointing away from the other confronting land.

6. A tool as defined in claim 1 wherein said forwardly facing land includes an acute angle with said longitudinal direction and with said lateral land, said rearwardly facing land being devoid of any cutting edge.

7. A tool as defined in claim 1 wherein said abutment means forms a detent resiliently coacting with a mating formation on said guide member.

8. A tool as defined in claim 1 wherein said link member forms an integral unit with said first stripping jaw.

9. A tool as defined in claim 1 wherein said members and said stripping jaws consist of a material of higher strength than that of said body.

10. A tool as defined in claim 9 wherein said material of higher strength is sheet steel, the material of said body being selected from the group which consists of light-metal allows and synthetic resins.

* * * * *